(12) United States Patent
Zheng et al.

(10) Patent No.: US 12,199,297 B2
(45) Date of Patent: Jan. 14, 2025

(54) BATTERY MODULE AND VEHICLE (71) Applicant: CONTEMPORARY AMPEREX TECHNOLOGY (HONG KONG) LIMITED, Hong Kong (CN)

(72) Inventors: Renwei Zheng, Ningde (CN); Mu Qian, Ningde (CN); Shaozhen Chen, Ningde (CN); Jihua Yao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 607 days.

(21) Appl. No.: 17/502,452

(22) Filed: Oct. 15, 2021

(65) Prior Publication Data

US 2022/0037729 A1 Feb. 3, 2022

Related U.S. Application Data

(63) Continuation of application No. PCT/CN2020/084060, filed on Apr. 9, 2020.

(30) Foreign Application Priority Data

Apr. 15, 2019 (CN) .......................... 201910298777.3

(51) Int. Cl.
*H01M 50/242* (2021.01)
*H01M 50/204* (2021.01)
(Continued)

(52) U.S. Cl.
CPC ....... *H01M 50/242* (2021.01); *H01M 50/204* (2021.01); *H01M 50/224* (2021.01);
(Continued)

(58) Field of Classification Search
None
See application file for complete search history.

(56) References Cited

U.S. PATENT DOCUMENTS

2013/0017436 A1  1/2013  Kume
2016/0204400 A1  7/2016  Baek et al.

FOREIGN PATENT DOCUMENTS

CN         101047288 A    10/2007
CN         103490024 A     1/2014
            (Continued)

OTHER PUBLICATIONS

Machine Translation of CN-106531913-A (Year: 2017).*
(Continued)

*Primary Examiner* — Gregg Cantelmo
(74) *Attorney, Agent, or Firm* — ANOVA LAW GROUP, PLLC (57) ABSTRACT

A battery module and a vehicle. The battery module includes: a unit battery; an end plate located at an end of the battery module along a length direction; and an output pole base including a mounting part and a matching part which are fixedly connected, where the matching part is made of metal material and is fixedly connected to the end plate to limit the freedom degree of movement of the output pole base relative to the end plate along the height direction, the width direction and the length direction. The plastic structure of the output pole base is added a matching part made of metal material therein and is fixedly connected to the end plate by the matching part.

16 Claims, 10 Drawing Sheets

(51) Int. Cl.
*H01M 50/224* (2021.01)
*H01M 50/244* (2021.01)
*H01M 50/249* (2021.01)
*H01M 50/262* (2021.01)
*H01M 50/296* (2021.01)

(52) U.S. Cl.
CPC ....... *H01M 50/244* (2021.01); *H01M 50/249* (2021.01); *H01M 50/262* (2021.01); *H01M 50/296* (2021.01); *H01M 2220/20* (2013.01)

(56) References Cited

FOREIGN PATENT DOCUMENTS

| | | | | |
|---|---|---|---|---|
| CN | 204858060 U | 12/2015 | | |
| CN | 204991808 U | 1/2016 | | |
| CN | 105723561 A | 6/2016 | | |
| CN | 106531913 A | * 3/2017 | ............ | H01M 50/20 |
| CN | 206727133 U | 12/2017 | | |
| CN | 206947426 U | 1/2018 | | |
| CN | 108023044 A | 5/2018 | | |
| CN | 207345536 U | 5/2018 | | |
| CN | 207743290 U | 8/2018 | | |
| CN | 207896173 U | 9/2018 | | |
| CN | 109192891 A | 1/2019 | | |
| CN | 208336330 U | 1/2019 | | |
| CN | 208507805 U | 2/2019 | | |
| CN | 208674174 U | 3/2019 | | |
| CN | 208819951 U | 5/2019 | | |
| EP | 3432386 A1 | 1/2019 | | |
| EP | 3629398 A1 | 4/2020 | | |
| KR | 100904373 B1 | 6/2009 | | |
| KR | 20160023380 A | 3/2016 | | |
| WO | 2016072041 A1 | 8/2017 | | |

OTHER PUBLICATIONS

Machine Translation of CN-206727133U (Year: 2017).*
Extended European Search Report issued on Sep. 6, 2021, in connection with corresponding European Application No. 20791514.1; 10 pages.
The World Intellectual Property Organization (WIPO) Written Opinion for PCT/CN2020/084060 Jul. 15, 2020 6 pages (Including English translation).
The China National Intellectual Property Administration (CNIPA) Notice of Grant of Invention Patent Right for CN Application No. 201910298777.3 Sep. 9, 2021 4 Pages (Including English translation).
The European Patent Office (EPO) Communication pursuant to Article 94(3) EPC for EP Application No. 20791514.1 Jan. 2, 2024 3 Pages.
International Search Report issued on Jul. 15, 2020 in corresponding International application No. PCT/CN2020/084060; 4 pages.
Office Action issued on Mar. 15, 2021 in corresponding Chinese Application No. 201910298777.3; 7 pgs.
Office Action issued on May 17, 2021 in corresponding Chinese Application No. 201910298777.3; 6 pgs.
Office Action issued on Jul. 23, 2021 in corresponding Chinese Application No. 201910298777.3; 3 pgs.

* cited by examiner

BATTERY MODULE AND VEHICLE

CROSS-REFERENCE TO RELATED APPLICATIONS

This application is a continuation of International Application No. PCT/CN2020/084060, filed on Apr. 9, 2020, which claims priority to Chinese patent application No. 201910298777.3 filed on Apr. 15, 2019 and entitled "Battery Module". Both of the aforementioned applications are hereby incorporated by reference in their entireties.

TECHNICAL FIELD

The present application relates to the technical field of energy storage device, in particular, to a battery module and a vehicle.

BACKGROUND

The battery module includes an output pole base for providing insulation protection for the output pole connecting piece and the module connecting piece. Generally, the output pole base is located at the end of the battery module along the length direction and is fixed with the end plate. The specific means is that a processing groove is provided on the end plate, and at the same time, a bump is arranged at the bottom of the output pole base to match with the processing groove, so as to make the output pole base connects with the end plate therebetween by the means of the contour complementary matching. When this connection means is adopted, there is a gap between the bump of the output pole base and the processing groove of the end plate, and they cannot be completely fixed.

When the vibration of the battery module is occurred, it drives the output pole base to vibrate, which will lead to fracture of the sampling structure connected to the output pole connecting piece, and cause fracture failure between the output pole connecting piece and the pole column, and as a result, the battery module fails to work normally.

SUMMARY

In view of this, the embodiments of the present application provide a battery module and a vehicle to solve the problem in the prior art that the battery module cannot work normally since the output pole base and the end plate cannot be completely fixed.

The embodiments of the present application provide a battery module, including:

a unit battery; an end plate, located at an end of the battery module along a length direction; an output pole base, including a mounting part and a matching part which are fixedly connected, where the matching part is made of metal material and is fixedly connected to the end plate to limit the freedom degree of movement of the output pole base relative to the end plate along the height direction, the width direction and the length direction.

Optionally, the matching part and the end plate have an interference fit, or; the matching part and the end plate have a hardness difference, so that the matching part can penetrate into the end plate or a portion of the end plate can penetrate into the matching part.

Optionally, the end plate includes a matching wall that is made of metal material; the matching part includes one or more claws which are made of metal material and at least partially penetrate into the matching wall.

Optionally, along the width direction of the battery module, both sides of the matching wall are provided with the claws; the matching part also includes a first connecting plate, and two ends of the first connecting plate along the width direction W are connected to the claws located on two sides of the matching wall.

Optionally, along the height direction of the battery module, the claw is inclined with respect to the matching wall and an inclination direction is upward.

Optionally, the mounting part is provided with a mounting groove, the matching part is located in the mounting groove, the side wall of the mounting groove has a clamping groove, the bottom wall of the mounting groove has a first limiting portion, and the clamping groove and the first limiting portion are distributed along the height direction; along the height direction, one end of the matching part is clamped in the clamping groove, and the other end abuts against the first limiting portion.

Optionally, the side wall of the mounting groove also has a second limiting portion, and the matching part is clamped to the second limiting portion to limit the freedom degree of movement of the matching part along the length direction.

Optionally, the end plate has a first matching cavity, and the first matching cavity is located on both sides of the matching wall along the width direction; the side wall of the mounting groove is located in the first matching cavity, and the side wall of the mounting groove is matched with the first matching cavity.

Optionally, the mounting part further includes a guide portion, the end plate has a second matching cavity, and the guide portion matches the second matching cavity.

Optionally, the inner wall of the second matching cavity along the length direction L is provided with an end plate boss.

Optionally, along the width direction, the guide portion has a first end and a second end, and the size of the second end along the length direction L is smaller than that of the first end along the length direction.

Optionally, the mounting part has one or more convex ribs, and the convex ribs extend along the height direction; a cross section of the convex rib is one or more of a triangle, a diamond and a cone.

Optionally, the mounting part further includes a bump that is located above the convex rib.

Embodiments of the present application also provide a vehicle, which includes any of the battery modules described above.

In the present application, the plastic structure of the output pole base is added a matching part made of metal material therein, and is fixedly connected to the end plate by the matching part, so as to achieve the complete fixing between the output pole base and the end plate and reduce the risk of relative movement between the output pole base and the end plate during the vibration process of the battery module, thereby reducing the risk of the sampling structure fracture, improving the connection reliability between the output pole connecting piece and the unit battery pole column and prolonging the service life of the battery module. At the same time, because both the matching part and the end plate are made of metal material, it is less likely to form a gap between the both during long-term operation, thus further prolonging the service life of the battery module.

DETAILED DESCRIPTION

In order to make the above objects, features and advantages of the embodiments of the present disclosure more obvious and easy to understand, the technical solution in the embodiments of the present disclosure will be described clearly and completely with reference to the accompanying drawings in the embodiments of the present disclosure. Obviously, the described embodiments are only some embodiments of the present disclosure, rather than all the embodiments. Based on the embodiments of the present disclosure, all other embodiments obtained by those of ordinary skill in the art without creative labor belong to the scope of protection of the present disclosure.

Figure 1:
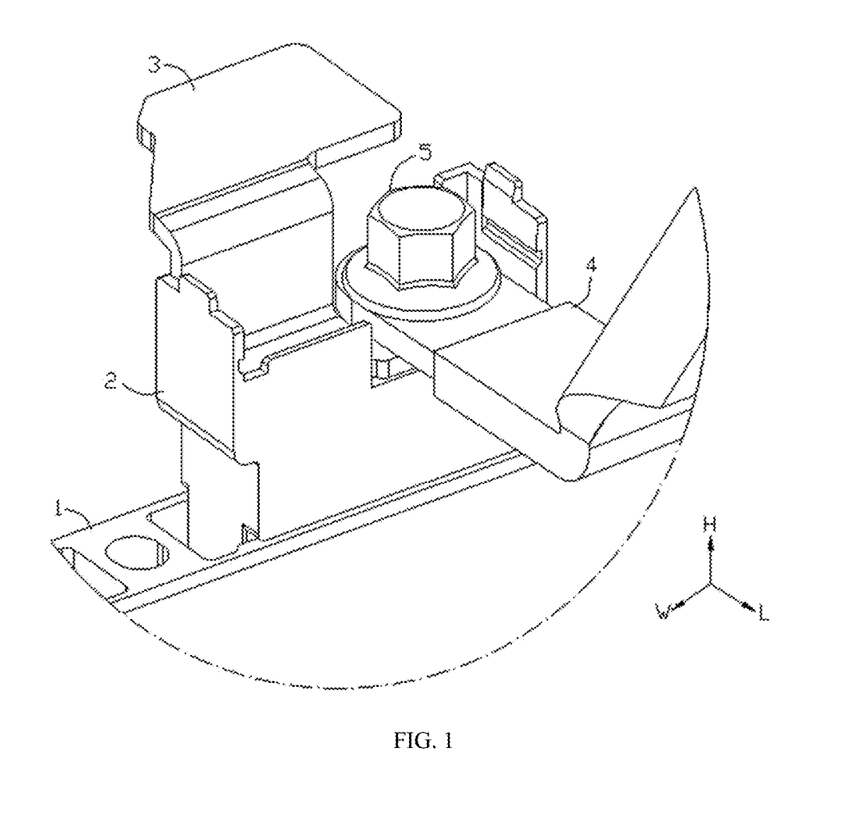
FIG. 1 is a partial structural diagram of a battery module provided by the present application in a specific embodiment;
}
Figure 2:
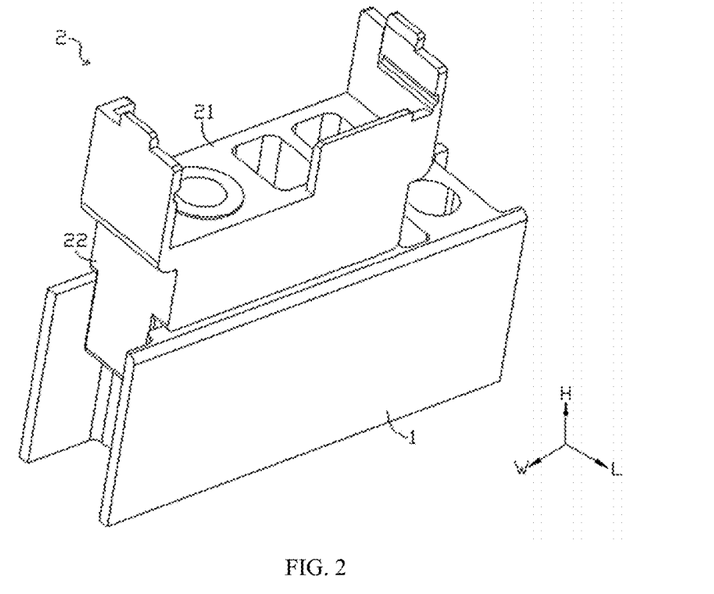
FIG. 2 is a structural diagram showing matching between the end plate and the output pole base in FIG. 1.
Figure 3:
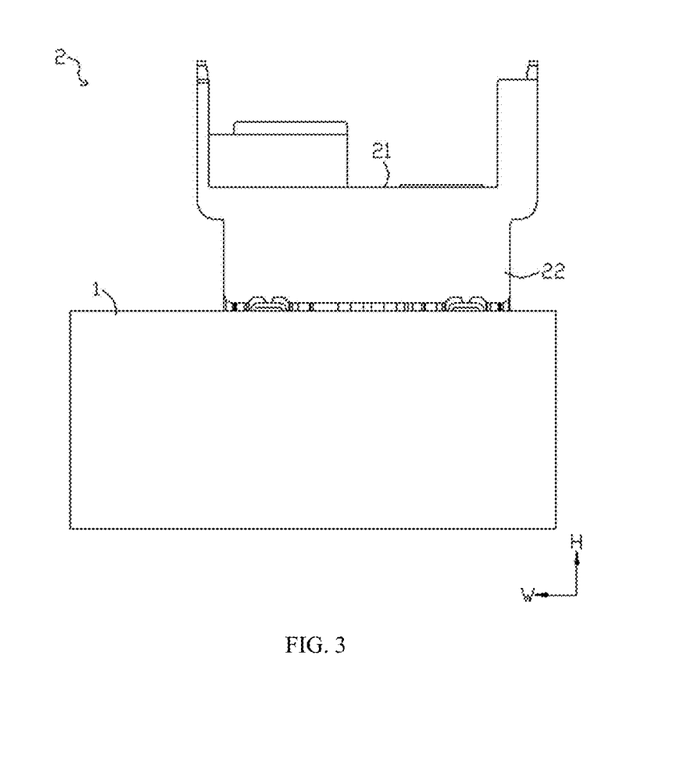
FIG. 3 is a front view of FIG. 2.
Figure 4:
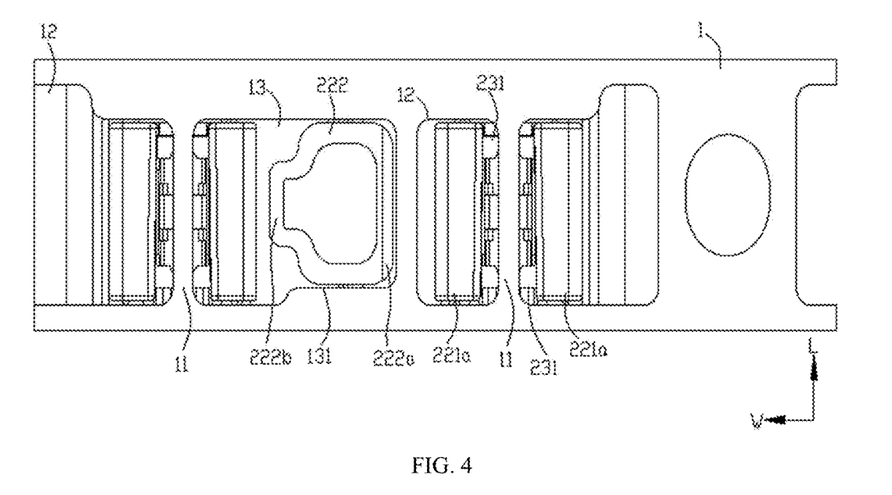
FIG. 4 is a bottom view of FIG. 2.
Figure 5:
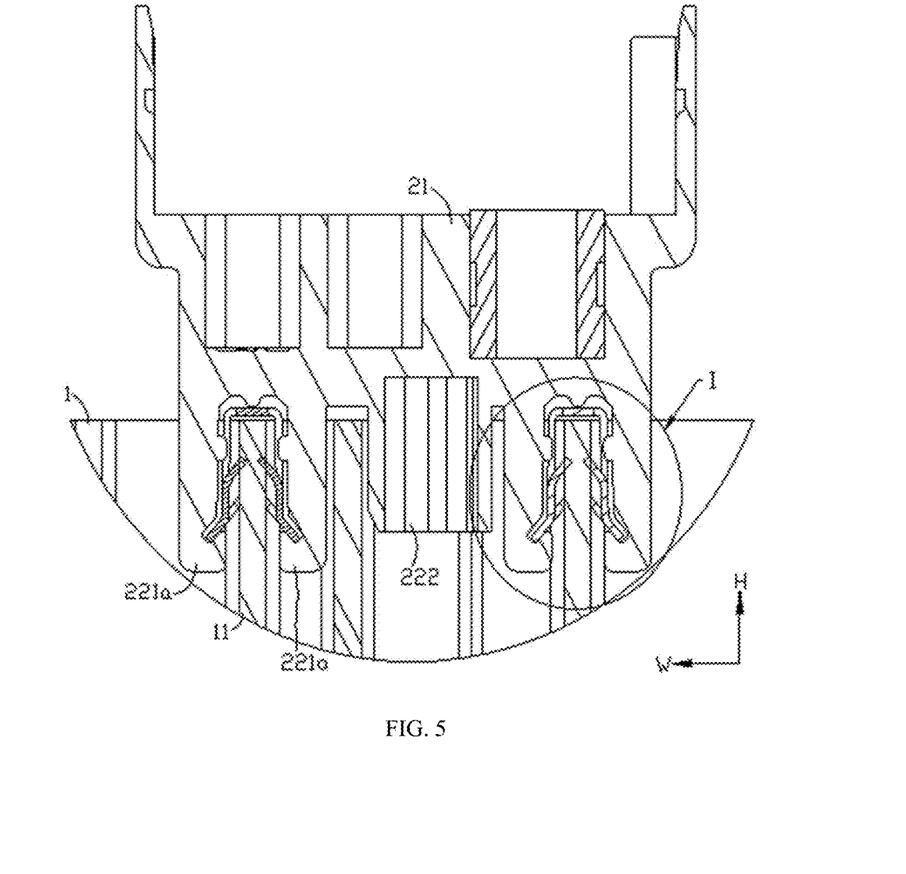
FIG. 5 is a partial cross-sectional view of FIG. 3.
Figure 6:
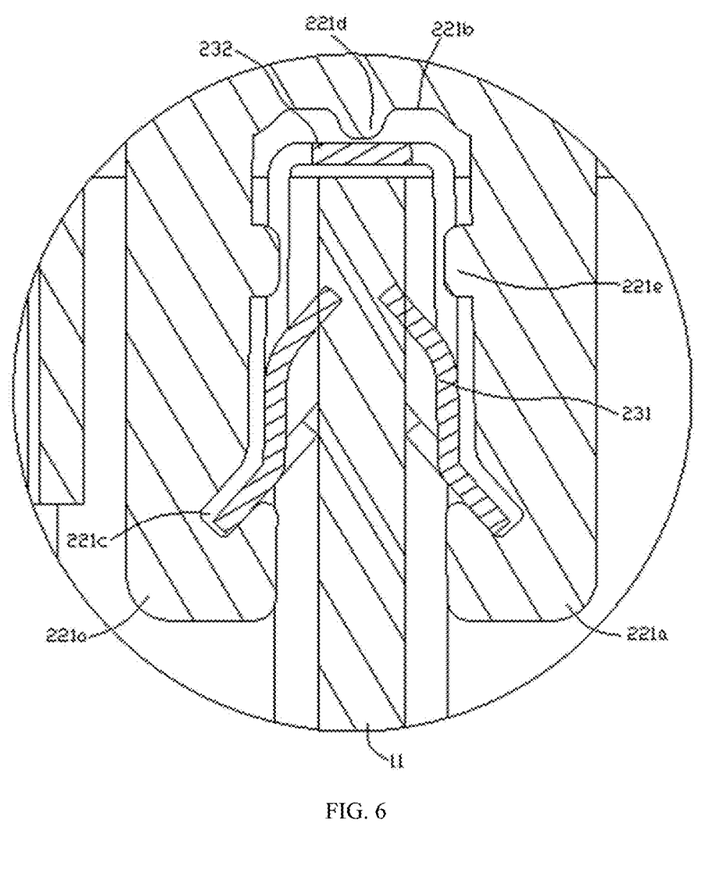
FIG. 6 is a partial enlarged view of part I in FIG. 5.
Figure 7:
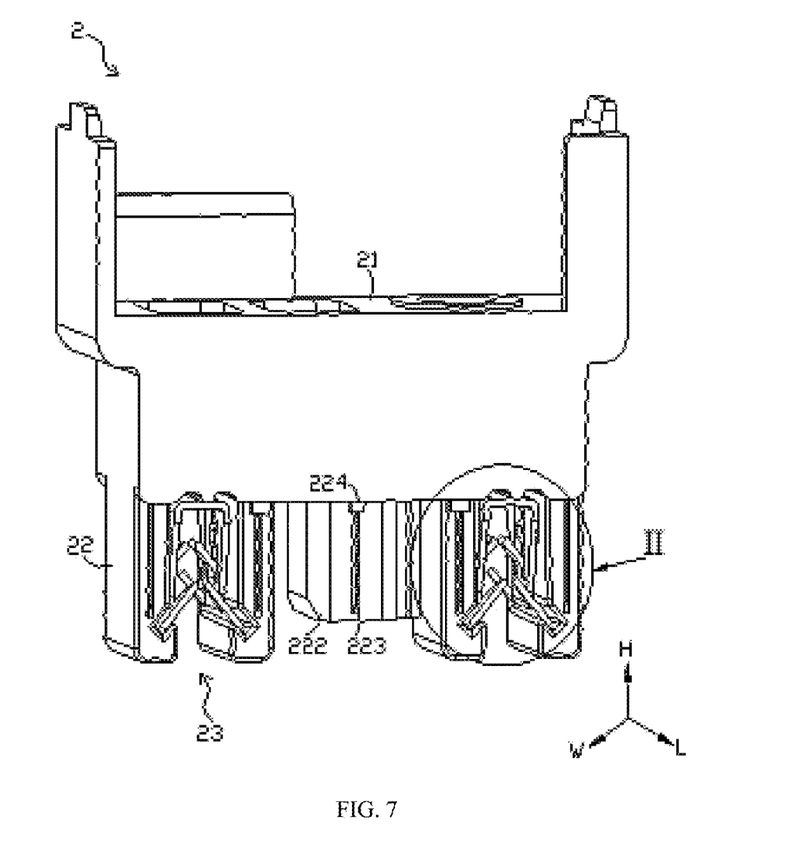
FIG. 7 is a structural diagram of the output pole base in FIG. 2.
Figure 8:
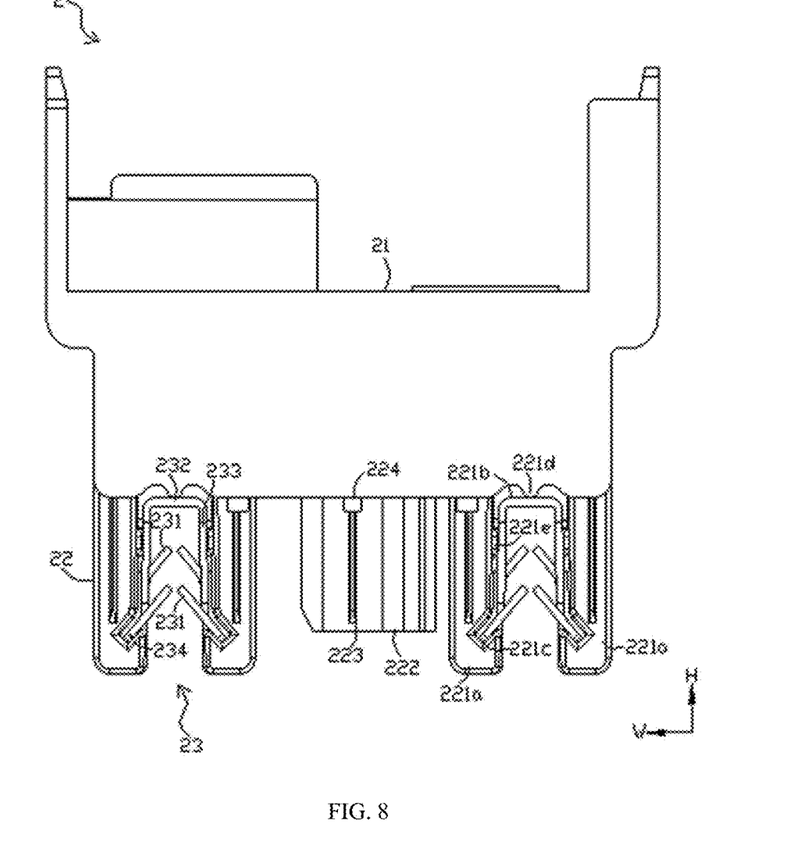
FIG. 8 is a front view of FIG. 7.
Figure 9:
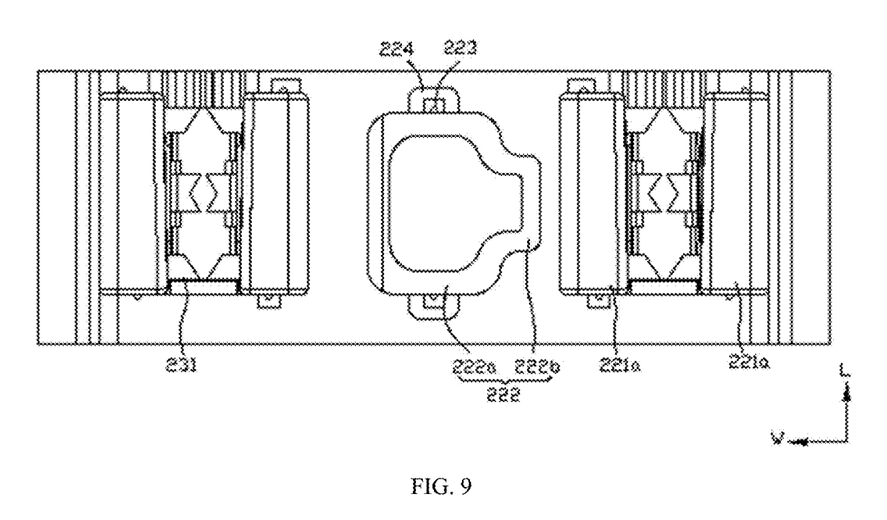
FIG. 9 is a bottom view of FIG. 8.
Figure 10:
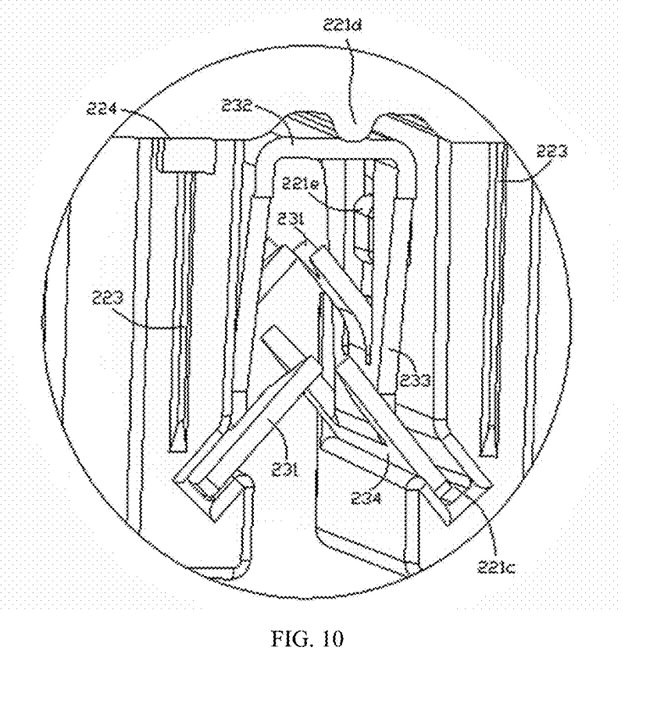
FIG. 10 is a partial enlarged view of part II in FIG. 7.
Figure 11:
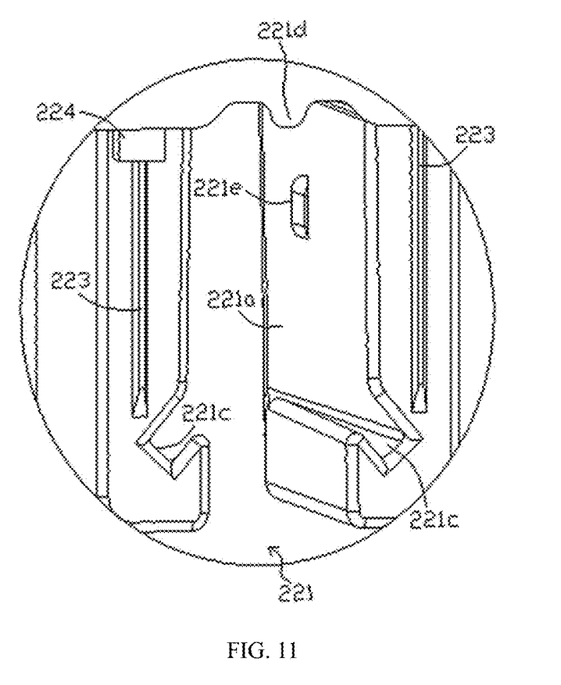
FIG. 11 is a structural diagram that the matching part is removed in FIG. 10.
Figure 12:
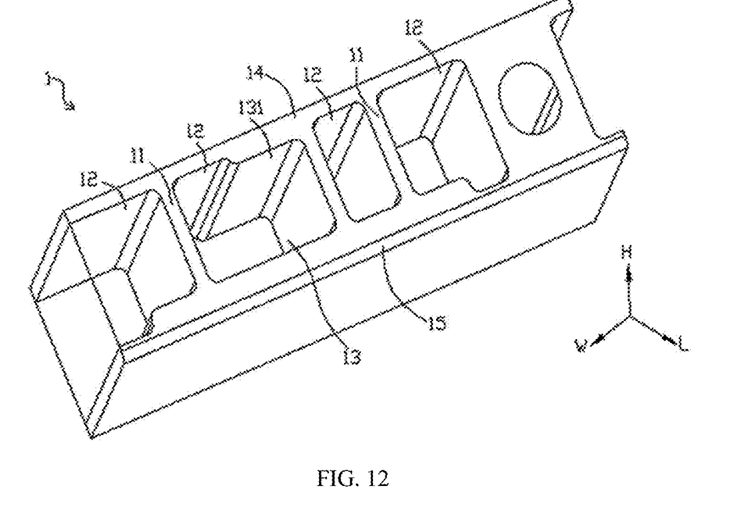
FIG. 12 is a structural diagram of the end plate in FIG. 2.
Figure 13:
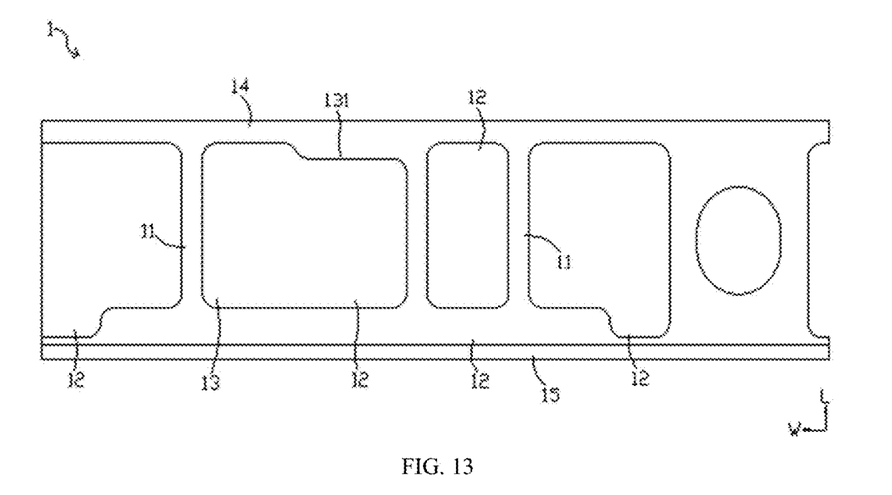
FIG. 13 is a top view of FIG. 12.

Please refer to FIG. 1 to FIG. 13, where FIG. 1 is a partial structural diagram of a battery module provided by the present application in a specific embodiment; FIG. 2 is a structural diagram showing matching between the end plate and the output pole base in FIG. 1; FIG. 3 is a front view of FIG. 2; FIG. 4 is a bottom view of FIG. 2; FIG. 5 is a partial cross-sectional view of FIG. 3; FIG. 6 is a partial enlarged view of part I in FIG. 5; FIG. 7 is a structural diagram of the output pole base in FIG. 2; FIG. 8 is a front view of FIG. 7; FIG. 9 is a bottom view of FIG. 8; FIG. 10 is a partial enlarged view of part II in FIG. 7; FIG. 11 is a structural diagram that the matching part is removed in FIG. 10; FIG. 12 is a structural diagram of the end plate in FIG. 2; FIG. 13 is a top view of FIG. 12.

The embodiment of the present application provides a battery module, which includes a housing (not shown in the figure) with an inner cavity; further includes one or more unit batteries (not shown in the figure). When the battery module includes a plurality of unit batteries, each unit battery is stacked in the inner cavity of the housing according to a preset rule. Generally, the stacking direction of each unit battery is the length direction L of the battery module. Among them, the housing includes two end plates 1 and two side plates, and the end plate 1 and side plate are fixedly connected to form the housing of the battery module, which function as protecting each unit battery.

Meanwhile, in the battery module, the pole column of the outermost unit battery is connected to the output pole connecting piece 3. In the battery pack, the output pole connecting piece 3 of the adjacent battery module is connected to the module connecting piece 4. The battery module also includes an output pole base 2. As shown in FIG. 1, both the above output pole connecting piece 3 and module connecting piece 4 are connected to the output pole base 2, which is used to provide insulation protection for the output pole connecting piece 3 and module connecting piece 4.

Among them, as shown in FIG. 1, the output pole base 2 includes a body 21 that has a nut arranged therein. the output pole connecting piece 3 and the module connecting piece 4 are all provided with bolt holes, during the connection, the bolt 5 passes through both bolt holes and is fixedly connected to the nut in the body 21.

Generally, the output pole base 2 is located at the end of the battery module along the longitudinal direction L and is fixed to the end plate 1. the specific means is that a processing groove is provided on the end plate 1 (e.g., a dovetail groove), and at the same time, a bump (e.g., a dovetail bump) is arranged at the bottom of the output pole base 2 to match with the processing groove, so that the output pole base 2 and the end plate 1 are connected therebetween by means of the contour complementary matching. When this connection means is adopted, there is a gap between the bump of the output pole base 2 and the processing groove of the end plate 1, and the output pole base 2 and the end plate 1 cannot be completely fixed along the length direction L, width direction W and height direction H.

At the same time, because the end plate 1 is made of metal material and the output pole base 2 is made of plastic material, when the both are connected by means of contour complementary matching, the gap between the both gradually increases, which leads to the decrease of the connection reliability between the both.

Therefore, when the vibration of the battery module is occurred, it drives the output pole base 2 to vibrate, which leads to fracture of the sampling structure connected to the output pole connecting piece 3, and causes the battery module cannot be sampled normally. In addition, when the vibration displacement of the output pole base 2 along the height direction H is large, the connection reliability between the output pole connecting piece 3 and the unit battery pole column is decreased, thereby causing the fracture failure, and as a result, the battery module fails to work normally. The present application mainly solves the above technical problems by optimizing the structure of the output pole base 2.

Among them, as shown in FIG. 7 and FIG. 8, the output pole base 2 includes a body 21, a mounting part 22 and a matching part 23 which are fixedly connected, where the body 21 is provided with threaded holes for connecting with the output pole connecting piece 3 and the module connecting piece 4 through bolts 5, and the body 21 is made of plastic material, thus providing insulation protection for the output pole connecting piece 3 and the module connecting piece 4. At the same time, the mounting part 22 is integrated with the body 21 and is also made of plastic material. The mounting part 22 is used for mounting a matching part 23 that is made of metal material, and the matching part 23 is used for fixedly connecting to the end plate 1, to limit the freedom degree of movement of the output pole base 2 relative to the end plate 1 along the height direction H, the length direction 1 and the width direction.

In the present application, the plastic structure of the output pole base 2 is added a matching part 23 made of metal material therein, and is fixedly connected to the end plate 1 by the matching part 23, so as to achieve the complete fixing between the output pole base 2 and the end plate 1 and reduce the risk of relative movement between the output pole base 2 and the end plate 1 during the vibration process of the battery module, thereby reducing the risk of the sampling structure fracture, improving the connection reliability between the output pole connecting piece 3 and the unit battery pole column and prolonging the service life of the battery module. At the same time, because both the matching part 23 and the end plate 1 are made of metal material, it is less likely to form a gap between the both during long-term operation, thus further prolonging the service life of the battery module.

Among them, the fixing connection means between the above matching part 23 and the end plate 1 may be: the matching part 23 and the end plate 1 have an interference fit, so that the fixing connection between the end plate 1 and the output pole base 2 can be realized. And compared with the contour complementary matching connection between the plastic part (the output pole base) and the metal part (the end plate) in the prior art, the interference fit between the two metal parts have higher connection reliability.

Alternatively, the above fixing connection means between the matching part 23 and the end plate 1 may also be: as shown in FIG. 5, the matching 23 and the end plate 1 are both made of metal material and there is a hardness difference between the both. For example, the hardness of the matching part 23 is greater than that of the end plate 1, so that the matching part 23 can penetrate into the end plate 1, or the hardness of the end plate 1 is greater than that of the matching part 23, so that the end plate 1 can penetrate into the matching part 23. In the present embodiment, the connection reliability between the matching part 23 and the end plate 1 can be further improved by connection means of penetrating between the matching part 23 and the end plate 1, and the relative displacement between the matching part 23 and the end plate 1 along the height direction H can be reduced after the matching part 23 penetrates into the end plate 1, thereby reducing the risk of vibration of the output pole base 2 along the height direction H and improving the connection reliability between the output pole connecting piece 3 and the unit battery pole column.

Among them, as shown in FIG. 5, the end plate 1 includes a matching wall 11 made of metal material, at the same time, the matching part 23 includes one or more claws 231 which are made of metal material and can penetrate into the matching wall 11, that is, the hardness of the claws 231 is greater than that of the matching wall 11. In the present embodiment, the fixing connection between the output pole base 2 and the end plate 1 can be realized by the claws 231 and the matching wall 11.

Furthermore, as shown in FIG. 6, the matching part 23 includes two claws 231 and a first connecting plate 232, the two claws 231 are located on both sides of the matching wall 11 along the width direction W, and two ends of the first connecting plate 232 along the width direction W is connected to the two claws 231, thereby connecting the claws 231 on both sides of the matching wall 11 into a whole, improving the integrity of the matching part 23 and improving the connection reliability between the matching part 23 and the end plate 1.

In this embodiment, by arranging the claws 231 on both sides of the matching wall 11 along the width, the connection reliability between the matching part 23 and the end plate 1 can be further improved, and the structures on both sides of the matching part 23 are symmetrical with respect to the matching wall 11 for each other, so that stress on the connection position between the matching part 23 and the end plate 1 can be more uniform, the risk of stress concentration can be reduced, and the service life of each component can be prolonged.

At the same time, because the end plate 1 extends along the width direction W, the output pole base 2 is provided with a plurality of above matching parts 23 along the width direction W, and correspondingly, the end plate 1 is provided with a plurality of above matching walls 11, thereby further improving the connection reliability between the output pole base 2 and the end plate 1. In the embodiment shown in FIG. 4, the output pole base 2 includes two matching parts 23 along the width direction W, and the end plate 1 includes two matching walls 11 along the width direction W.

On the other hand, along the height direction H of the battery module, the output pole base 2 is mounted above the end plate 1, and the claw 231 is inclined with respect to the matching wall 11, and the inclination direction is upward.

In the present application, when the battery module is assembled, the output pole base 2 is press-mounted to the end plate 1 from top to bottom. During the press-mounted process, the claw 231 of the output pole base 2 penetrates into the matching wall 11 of the end plate 1, and after penetration, the claw 231 is still inclined upward. When the output pole base 2 vibrates, it can prevent the claw 231 from coming out of the matching wall 11, thus improving the connection reliability between the both.

Among them, as shown in FIG. 7 to FIG. 10, the thickness of the end of the claw 231 is small, which forms the tip of the claw 231. When the claw 231 contacts the matching wall 11, the stress of the tip on the matching wall 11 is greater, thus promoting the penetration of the claw 231 into the matching wall 11. Meanwhile, the claw 231 has one or more above tips, and each tip is distributed along the length direction L and is connected into a whole through the first connecting plate 232.

In the embodiment shown in FIG. 9, the claw 231 has four above tips along the length direction L, and each tip can penetrate into the matching wall 11. It can be understood that in the present embodiment, the number of tips in the claws 231 can be set according to the size of the matching wall 11. When the size of the matching wall 11 along the length direction L is larger, the number of tips increases, and when the size of the matching wall 11 along the length direction L is smaller, the number of tips decreases. Therefore, in the present application, the number of the above tips is not limited.

On the other hand, the above matching part 23 is mounted on the mounting part 22 of the output pole base 2, where as shown in FIG. 10 and FIG. 11, the mounting part 22 is provided with a mounting groove 221 where the matching part 23 is located in the mounting groove 221 and is along the width direction W. The mounting groove 221 has two side walls 221*a* arranged opposite, and the two side walls 221*a* are connected therebetween by a bottom wall 221*b*. And the bottom of the side wall 221*a* of the mounting groove 221 has a clamping groove 221*c*, and the bottom wall 221*b* of the mounting groove 221 has a first limiting portion 221*d*. Therefore, along the height direction H, one end of the matching part 23 is clamped in the clamping groove 221*c*, and the other end abuts against the first limiting portion 221*d*.

In the present embodiment, by arranging the clamping groove 221*c* and the first limiting portion 221*d* distributed along the height direction H on the mounting part 22, the freedom degree of movement of the matching part 23 relative to the mounting part 22 along the height direction H can be limited, thereby preventing the matching part 23 from coming out of the mounting part 22 along the height direction H.

Among them, as shown in FIG. 10 and FIG. 11, the clamping groove 221*c* is inclined with respect to the height direction H, that is, there is a clamping angle between the bottom wall of the clamping groove 221*c* and the height direction H, and the side wall of the clamping groove 221*c* is not parallel with the height direction H, meanwhile, the bottom of the matching part 23 also includes a third connecting plate 234 which is inclined with respect to the height direction H, so that the third connecting plate 234 can be clamped within the clamping groove 221c and the claw 231 is inclined with respect to the height direction H.

On the other hand, as shown in FIG. 10 and FIG. 11, the first limiting portion 221d can be specifically a flange arranged at the bottom wall 221b of the mounting groove 221, and the flange protrudes toward the inside of the mounting groove 221 and extends along the longitudinal direction L, so that it can abut against the first connecting plate 232 of the matching part 23.

Meanwhile, as shown in FIG. 10 and FIG. 11, the side wall 221a of the mounting groove 221 also has a second limiting portion 221e. Accordingly, the claw 231 includes two second connecting plates 233 along the length direction L, and there is a gap between the two second connecting plates 233 along the length direction L, so that the second limiting portion 221e is clamped between the two second connecting plates 223 to limit the freedom degree of the movement of the matching part 23 along the length direction L, thereby preventing the matching part 23 from coming out of the mounting part 22 along the length direction L.

Among them, as shown in FIG. 10 and FIG. 11, the second limiting portion 221e specifically can be a bump arranged at the side wall 221a of the mounting groove 221, and the bump protrudes toward the inside of the mounting groove 221.

In addition, as described above, the matching part 23 is located in the mounting groove 221 of the mounting part 22, so that the freedom degree of movement of the matching part 23 along the width direction W can be limited by the two side walls 221a of the mounting groove 221, thereby preventing the matching part 23 from coming out of the mounting part 22 along the width direction W.

In summary, in the present application, by arranging the above first limiting portion 221d, the clamping groove 221c and the second limiting portion 221e on the mounting part 22, the matching part 23 can be achieved to be mounted on the mounting part 22; and by the above structure, the connection reliability between the both is enabled to be higher.

Furthermore, as shown in FIG. 12 and FIG. 13, the end plate 1 has a plurality of first matching cavities 12, and both sides of the matching wall 11 have the first matching cavities 12 along the width direction W. When the output base 2 is press-mounted to the end plate 1, the two side walls 221a of the above mounting groove 221 are respectively located inside the two first matching cavities 12, and the two portions of structures of the matching part 23 along the width direction are respectively located inside the first matching cavities 12. Among them, the end plate 1 includes an inner plate 14 and an outer plate 15 distributed along the length direction L, and the both are connected therebetween by the above matching wall 11. The inner plate 14, the outer plate 15 and the matching wall 11 enclose the first matching cavity 12.

Therefore, in the present embodiment, the end plate 1 includes a plurality of mutually spaced hollow cavity structures, so that it can reduce the weight of the end plate 1 while ensuring its high strength and rigidity, thereby improving the energy density of the battery module.

Furthermore, as shown in FIG. 7 to FIG. 9, the mounting part 22 also includes a guide portion 222. Accordingly, the end plate 1 has a second matching cavity 13, and the guide portion 222 matches with the second matching cavity 13. During the assembly, the guide portion 222 and the second matching cavity 13 function as guiding the output pole base 2, so as to achieve the mounting of the output pole base 2 and the end plate 1.

Among them, in the embodiment shown in FIG. 7 to FIG. 9, along the width direction W, the guide portion 222 is located between two matching parts 23, and correspondingly, the second matching cavity 13 is located between two first matching cavities 12. As shown in FIG. 4 and FIG. 13, the above first matching cavity 12 and the second matching cavity 13 are arranged in the middle of the end plate 1 along the width direction W, and the second matching cavity 13 is in communication with the first matching cavity 12. Of course, the matching wall 11 can also be arranged between the second matching cavity 13 and the first matching cavity 12 to separate the two matching cavities and further improve the strength and rigidity of the end plate 1.

Among them, as shown in FIG. 12 to FIG. 13, the inner wall of the second matching cavity 13 is provided with an end plate boss 131, and the end plate boss 131 protrudes toward the inside of the second matching cavity 13 and the end plate boss 131 is provided on the inner plate 14 or the outer plate 15 of the end plate 1.

As shown in FIG. 4, when the end plate boss 131 is arranged on the outer plate 15, the guide portion 222 is located between the inner plate 14 and the end plate boss 131 and is mounted with the above. At the same time, as mentioned above, the side wall 221a of the mounting groove 221 in the mounting part 22 is located in the first matching cavity 12 and matches the side wall of the first matching cavity 12. Therefore, in the output pole base 2 and the end plate 1, the both are in the relative position shown in FIG. 4 (the output pole base 2 is placed forward), it can achieved to be mounted. When the both are opposite along the length direction L (the output pole base 2 is placed oppositely), since there is the end plate boss 131, when the output pole base 2 is mounted with the end plate 1, the end plate boss 131 interferes together with the side wall of the guide portion 222, that is, the both cannot be mounted. Therefore, in the present embodiment, by arranging the end plate boss 131, it is possible to prevent the reverse mounting of the output pole base 2.

Meanwhile, in the embodiment shown in FIG. 4 and FIG. 9, the guide portion 222 has a first end 222a and a second end 222b along the width direction W, where the size of the second end 222b is smaller than that of the first end 222a, and the both are connected therebetween through an inclined arc structure, so that the guide portion 222 is of a dovetail structure, and the guide portion 222 of the dovetail structure can match with an end plate provided with a dovetail groove in the prior art. It can also match with the end plate 1 provided with a square groove (as shown in FIG. 4) in the prior art. Therefore, the guide portion 222 of this structure makes the output pole base 2 to have higher applicability.

On the other hand, as shown in FIG. 8, the mounting part 22 has one or more convex ribs 223, and each convex rib 223 extends along the height direction H, where each convex rib 223 are arranged on the side wall 221a of the mounting groove 221 and the guide portion 222, the convex ribs 223 arranged on the side wall 221a of the mounting groove 221 abut against the inner wall of the first matching cavity 12, and the convex ribs 223 arranged on the guide portion 222 abut against the inner wall of the second matching cavity 13. Therefore, in the process of mounting the output pole base 2 and the end plate 1, the output pole base 2 is manually mounted on the end plate 1, and the abutting convex ribs 223 can play a guiding role with the inner wall of the corresponding matching cavity.

At the same time, the mounting part 22 also includes a bump 224, and the bump 224 is located above the convex rib 223. When manual mounting of the output pole base 2 and the end plate 1, the bump 224 abuts against the upper end face of the end plate 1 as the output pole base 2 is mounted, so that manual operation cannot make the output pole base 2 continue to move. At this time, the output pole base 2 can be continuously pressed down by mechanical tooling, and the bump 224 can be flattened to realize the interference fit between the mounting part 22 and the end plate 1.

Therefore, in the present embodiment, the distributed mounting of the output pole base 2 can be achieved through the above convex ribs 223 and bumps 224, that is, the position of the output pole base 2 can be achieved to be fixed through manual pre-mounting, and then press-mounting can be receiving through tooling. The above mounting process can absorb the manufacturing errors of the output pole base 2 and the end plate 1, thus contributing to improving the mounting reliability.

Among them, the cross section of the above convex rib 223 is one or more of a triangle, a diamond and a cone. At this time, the matching surface between the convex rib 223 and the inner wall of the matching cavity is small, thus reducing the friction between the both during manual mounting.

In the above various embodiments, the side wall 221*a* and the guide portion 222 of the mounting groove 221 in the mounting part 22 have interference fit with the matching cavity in the end plate 1. When the bolt 5 is mounted, the interference fit structure can withstand the torque in the mounting process, and can prevent the connection reliability between the output pole base 2 and the end plate 1 from being lowered due to the torque action.

Embodiments of the present application also provide a vehicle, which includes the battery module described in the above embodiments.

In the present specification, each embodiment or implementation is described in a progressive manner, and each embodiment focuses on the differences from other embodiments, so the same and similar parts between the various embodiments can be referred to each other.

In the description of the present specification, descriptions referring to terms "one embodiment", "some embodiments", "exemplary embodiments", "examples", "specific examples", or "some examples", etc. mean that specific features, structures, materials or characteristics described in connection with embodiments or examples are included in at least one embodiment or example of the present disclosure. In the present specification, the schematic expressions of the above terms do not necessarily refer to the same embodiments or examples. Furthermore, the specific features, structures, materials or characteristics described may be combined in any one or more embodiments or examples in a suitable manner.

Finally, it should be noted that the above embodiments are only used to illustrate the technical solution of the present disclosure, but not to limit it. Although the present disclosure has been described in detail with reference to the foregoing embodiments, those of ordinary skill in the art should understand that they still can modify the technical solutions described in the foregoing embodiments, or equivalently replace some or all of the technical features. However, these modifications or replacement do not cause the essence of the corresponding technical solutions to deviate from the scope of the technical solutions of the embodiments of the present disclosure.

What is claimed is:

1. A battery module, comprising:
   a unit battery;
   an end plate located at an end of the battery module along a length direction, the end plate comprising a matching wall;
   an output pole base comprising a mounting part and a matching part which are fixedly connected, wherein the matching part is made of metal material and is fixedly connected to the end plate to limit a freedom degree of movement of the output pole base relative to the end plate along a height direction, a width direction, and the length direction, the matching part comprises a plurality of claws at least partially penetrating into the matching wall, two sides of the matching wall are provided with the plurality of claws along the width direction of the battery module, the matching part further comprises a first connecting plate, two ends of the first connecting plate along the width direction are connected to the plurality of claws located on the two sides of the matching wall, and a hardness of the matching part is different from a hardness of the end plate, to cause the matching part to penetrate into the end plate or a portion of the end plate to penetrate into the matching part.

2. The battery module according to claim 1, wherein the matching part and the end plate have an interference fit.

3. The battery module according to claim 1, wherein the matching wall is made of metal material; and the plurality of claws are made of metal material.

4. The battery module according to claim 3, wherein, along the height direction of the battery module, the plurality of claws are inclined with respect to the matching wall, and an inclination direction is upward.

5. The battery module according to claim 3, wherein an end of one of the plurality of claws has one or more tips.

6. The battery module according to claim 1, wherein the mounting part is provided with a mounting groove, the matching part is located in the mounting groove, a side wall of the mounting groove has a clamping groove, a bottom wall of the mounting groove has a first limiting portion, and the clamping groove and the first limiting portion are distributed along the height direction;
   along the height direction, an end of the matching part is clamped in the clamping groove, and the other end abuts against the first limiting portion.

7. The battery module according to claim 6, wherein the side wall of the mounting groove further has a second limiting portion, and the matching part is clamped to the second limiting portion to limit the freedom degree of movement of the matching part along the length direction.

8. The battery module according to claim 6, wherein the end plate has first matching cavities that are located on both sides of the matching wall along the width direction;
   the side wall of the mounting groove is located in the first matching cavity and matches with the first matching cavity.

9. The battery module according to claim 1, wherein the mounting part further comprises a guide portion, the end plate has a second matching cavity, and the guide portion matches with the second matching cavity.

10. The battery module according to claim 9, wherein an inner wall of the second matching cavity along the length direction is provided with an end plate boss.

11. The battery module according to claim 9, wherein along the width direction, the guide portion has a first end and a second end, and size of the second end along the length direction is smaller than that of the first end along the length direction.

12. The battery module according to claim 1, wherein the mounting part has one or more convex ribs that extend along the height direction; and a cross section of the convex rib is one or more of a triangle, a diamond and a cone.

13. The battery module according to claim 12, wherein the mounting part further comprises a bump that is located above the convex rib.

14. A vehicle, comprising a battery module according to claim 1.

15. A battery module, comprising:
a unit battery;
an end plate located at an end of the battery module along a length direction;
an output pole base comprising a mounting part and a matching part which are fixedly connected, wherein the matching part is made of metal material and is fixedly connected to the end plate to limit a freedom degree of movement of the output pole base relative to the end plate along a height direction, a width direction, and the length direction;
wherein:
the mounting part is provided with a mounting groove, the matching part is located in the mounting groove, a side wall of the mounting groove has a clamping groove, a bottom wall of the mounting groove has a first limiting portion, and the clamping groove and the first limiting portion are distributed along the height direction; and
along the height direction, an end of the matching part is clamped in the clamping groove, and the other end abuts against the first limiting portion.

16. A battery module, comprising:
a unit battery;
an end plate located at an end of the battery module along a length direction;
an output pole base comprising a mounting part and a matching part which are fixedly connected, wherein the matching part is made of metal material and is fixedly connected to the end plate to limit a freedom degree of movement of the output pole base relative to the end plate along a height direction, a width direction, and the length direction;
wherein:
the mounting part has one or more convex ribs that extend along the height direction; and
a cross section of the convex rib is at least one of a triangle, a diamond, or a cone.

* * * * *